UNITED STATES PATENT OFFICE.

BENJAMIN E. DONHAM, OF SAULNIERVILLE, CANADA.

LINIMENT.

SPECIFICATION forming part of Letters Patent No. 454,334, dated June 16, 1891.

Application filed October 31, 1890. Serial No. 369,989. (No specimens.) Patented in Canada December 17, 1888, No. 30,418.

*To all whom it may concern:*

Be it known that I, BENJAMIN E. DONHAM, a citizen of the United States, residing at Saulnierville, in the county of Digby, Province of Nova Scotia, and Dominion of Canada, have invented a new and useful composition of matter, which is a liniment for use internally and externally in the treatment of the following diseases, namely: rheumatism, pains in the bowels and chest, sore throat, headaches, catarrh, bronchitis, diseases of the scalp, chapped hands, chilblains, bruises, sprains, swellings, and kindred diseases and ailments, (for which I have obtained a patent in the Dominion of Canada, No. 30,418, dated December 17, 1888,) of which the following is a specification.

My composition consists of the following ingredients, combined in the proportions stated, viz: pure water, nine gallons; starch, sixty-six ounces; camphor, (pulverized by means of alcohol,) nine pounds; olive-oil, three gallons; lye-soap, three gallons; terebene, one pint; strong liquor of ammonia, one and one-half gallon; carbonate of soda, one and one-half pound. These ingredients are to be thoroughly mingled by agitation.

What I claim, and desire to secure by Letters Patent of the United States, is—

The hereinbefore-described liniment, consisting of pure water, starch, camphor, (pulverized,) olive-oil, lye-soap, terebene, liquor of ammonia, and carbonate of soda.

Saulnierville, Digby county, N. S., October 6, A. D. 1890.

BENJAMIN E. DONHAM.

In presence of—
 JOSEPH A. SMITH,
 ALCIDE SAULNIER.